United States Patent
Falk et al.

(10) Patent No.: US 9,805,238 B2
(45) Date of Patent: Oct. 31, 2017

(54) SYSTEM FOR IDENTIFYING AND CONTROLLING UNMANNED AERIAL VEHICLES

(71) Applicant: VIGILENT INC., Tysons Corner, VA (US)

(72) Inventors: John Mansfield Falk, Alexandria, VA (US); Mark Anthony Sullivan, Alexandria, VA (US)

(73) Assignee: VIGILENT INC., Tysons Corner, VA (US)

( * ) Notice: Subject to any disclaimer, the term of this patent is extended or adjusted under 35 U.S.C. 154(b) by 0 days.

(21) Appl. No.: 15/206,671

(22) Filed: Jul. 11, 2016

(65) Prior Publication Data

US 2017/0255802 A1 Sep. 7, 2017

Related U.S. Application Data (60) Provisional application No. 62/301,858, filed on Mar. 1, 2016.

(51) Int. Cl.
- *G06F 17/00* (2006.01)
- *G06K 7/14* (2006.01)
- *G06K 7/10* (2006.01)

(52) U.S. Cl.
CPC ....... *G06K 7/1413* (2013.01); *G06K 7/10366* (2013.01); *G06K 7/1417* (2013.01)

(58) Field of Classification Search
CPC ........... G06F 17/00; G06K 19/00; G06K 7/00
USPC ........................................ 235/375, 487, 435
See application file for complete search history.

(56) References Cited

U.S. PATENT DOCUMENTS

| | | | |
|---|---|---|---|
| 2004/0024570 A1* | 2/2004 | Muehl | G06Q 10/06 702/184 |
| 2004/0249519 A1 | 12/2004 | Frink | |
| 2010/0085236 A1 | 4/2010 | Franceschini et al. | |
| 2014/0163852 A1 | 6/2014 | Borri et al. | |
| 2015/0106010 A1 | 4/2015 | Martin et al. | |
| 2015/0298786 A1* | 10/2015 | Stigler | B64B 1/10 244/30 |

FOREIGN PATENT DOCUMENTS

WO  2014197067 A1  12/2014

OTHER PUBLICATIONS

International Search Report and Written Opinion issued by the International Search Authority dated Jun. 1, 2017 in corresponding PCT Application No. PCT/US2017/019054 (13 pages).

* cited by examiner

*Primary Examiner* — Edwyn Labaze
(74) *Attorney, Agent, or Firm* — Buchanan Ingersoll & Rooney PC (57) ABSTRACT

A beacon for attachment to an unmanned aerial vehicle that provides information needed to identify the owner of a particular unmanned vehicle. The beacon may also include a remote communications module configured to participate on wireless communications networks and a beacon control system configured to issue commands compatible with the unmanned aerial vehicle. The beacon may further a beacon control system configured to translate multiple types of commands from different controls systems into commands compatible with the unmanned aerial vehicle.

4 Claims, 6 Drawing Sheets

SYSTEM FOR IDENTIFYING AND CONTROLLING UNMANNED AERIAL VEHICLES

CROSS-REFERENCE TO RELATED APPLICATIONS

This application claims the priority benefit of U.S. Provisional Patent Application No. 62/301,858 filed on Mar. 1, 2016 and entitled "System for Identifying and Controlling Unmanned Aerial Vehicles."

FIELD OF THE INVENTION

This application is directed to a system and method for remotely identifying and controlling a vehicle, and in particular, a system and method for remotely identifying and controlling an unmanned aerial vehicle.

BACKGROUND

Unmanned vehicles are being increasingly deployed for a variety of tasks including recreational activities such as recreational aerial filming or photography, monitoring of crops or wildlife, remote inspection of industrial equipment in areas where it may be dangerous or difficult to place personnel, law enforcement and search and rescue operations, delivery of supplies to remote or inaccessible locations, and military applications. Unmanned vehicles that are airborne are typically described as drones or unmanned aerial vehicles (UAVs). UAVs generally carry cameras, sensors, communications equipment, or other useful payloads, and certain larger UAVs are capable of carrying these payloads for an extended period of time. Other UAVs, such as those commonly available to individuals, have more limited capabilities and can only carry smaller payloads for a shorter period of time.

One common technical aspect shared by unmanned vehicles including UAVs is that the vehicles do not include human operators in the vehicle itself, so some form of remote control or self-piloting by the UAV itself is necessary. Accordingly, UAVs may either be remotely piloted or optionally piloted unmanned systems. When optionally piloted, known UAVs may fly autonomously based on pre-programmed flight plans, based on a set of predetermined rules, or a combination of both, for example. Even when remotely piloted, known UAVs may react autonomously in varying degrees in response to threats or other hazards. Such UAVs may employ limited autonomous modes that include the ability to self-level in flight, to loiter over a particular location, to execute take-offs or landings, to automatically travel to and return from a particular location, and to automatically land if communications are lost for an extended period of time. Some UAVs may include more autonomous modes that include the ability to execute complete flight plans by following waypoints, to react to obstacles while executing a flight plan or while being remotely piloted, and to perform certain portions of a flight plan with no oversight. Other known UAVs lack this capability and must be remotely piloted at all times. UAVs that are be typically purchased by consumers tend to require remote piloting at all times. There therefore exists a technical problem where at least some UAVs require at least remote control by a human operator.

Additionally, there exist growing concerns related to the increasing use of UAVs, governments are interested in regulating the use of UAVs. In particular, the integration of UAVs into a nation's regulated airspace that is used by manned vehicles such as conventional airplanes presents difficulties. Unlike the pilots for conventional airplanes, UAV operators need not obtain certifications or licenses prior to the operation of their devices. As such, many UAV operators may not be aware of the rules and regulations associated with portions of the airspace. Some jurisdictions such as the United States have imposed flight restrictions that ban the operation of UAVs in certain areas of the United States such as the airspace surrounding airports and the Washington, D.C. area. Even with this growing interest in regulation, however, no uniform technique for identifying the owner of a particular UAV exists should a violation occur, and no uniform technique is mandated by Federal Aviation Administration (FAA) regulations. In addition, the relatively small size and radio signature of a UAV makes it difficult to detect their presence in restricted airspace, particularly when the restricted airspace is monitored with equipment designed to detect conventional aircraft of a much larger size. A technical problem therefore exists where known UAVs are difficult to impose flight restrictions because there is no uniform technique for identifying the owner of a particular UAV, and UAVs are generally difficult to detect due to their relatively small size and radar signature.

Another regulatory reaction to the increasing use of UAVs is the enactment of a registration requirement for UAVs weighing more than half a pound but less than fifty-five pounds. Operations of these UAVs are required to obtain a Certificate of Authorization from the FAA and to mark their UAVs. Although the FAA provides a registration number with the completed Certificate of Authorization and ties the specific owner with the specific UAV, the FAA does not dictate how the registration number is to be placed onto the UAV. Instead, the FAA suggests placing the registration number on the UAV by using a permanent marker, a label, or by engraving the number onto the UAV. The FAA regulation also allows for the registration number to be placed in an accessible battery compartment. This multitude of possible locations and methods for marking a UAV make it difficult to quickly determine the party responsible for a UAV should an incident occur. This is particularly important in areas where UAV usage is restricted and the owner of the trespassing UAV must be ascertained in a timely manner. In addition, the various techniques suggested by the FAA require the UAV to be taken out of operation and landed before the registration number associated with the UAV may be ascertained. This therefore precludes the possibility of identifying the UAV operator while the UAV is in flight. There is therefore a technical problem where a particular UAV cannot be associated with its registration information while the UAV is in operation.

As discussed, known UAVs also depend on a remote human operator to provide at least some commands through wireless communications technologies. In addition, any imagery or other sensory data obtained by the UAV is typically desired by the human operators on a real-time or near real-time basis. Thus, two-way communication between the UAV and the human operator is desirable. Known UAVs typically available to consumers include the ability to use a Wi-Fi network to interface with the operator's smartphone, tablet, or other computing device. Wi-Fi networks are, however, limited in range and are susceptible to interference. More advanced UAVs employed by the military or law enforcement officials may use satellite links or other more robust and long-ranged wireless technologies to remain in contact with the operators over greater distances. These long-ranged wireless technologies are ordinarily well beyond the means of individuals and smaller corporations which limits the utility of UAVs in certain applications. There is therefore a technical problem where no uniform and reliable wireless communications between operators and various UAVs exists.

Another concern with UAVs is the multitude of control technologies being employed for different UAVs. Although certain consumer UAVs may be operated through smartphones, tablets, or other portable computing devices, more advanced UAVs may employ dedicated control systems specific to that particular model of UAV, or in some instances, a certain version of the particular model of UAV. The use of such dedicated control systems for UAVs that are tied to specific models and/or versions of UAVs therefore slows the adoption and deployment of advanced UAVs and imposes additional training requirements for operators. In addition, even though consumer UAVs may use portable computing devices as control systems, each UAV may utilize a unique control scheme that impedes the adoption of UAVs by consumers. The adoption of UAVs may therefore be facilitated by the utilization of more uniform control scheme so that a single control system may be employed for multiple models and/or versions of UAVs, and so that operators need not retrain or relearn a new control scheme for each UAV they operate. There therefore also exists technical problem where operators must learn each particular type of UAVs' specific control scheme and where each UAV may require a different control system.

These and other technical problems in known UAVs are addressed by the Vigilent Positioning System.

SUMMARY

The beacon, or Vigilent Positioning System described here, is attached to an unmanned aerial vehicle, the unmanned aerial vehicle including a control system, a sensory system, and a communications module. The beacon includes an attachment mechanism configured to securely and removably attach the apparatus to the unmanned aerial vehicle.

The beacon includes first indicia identifying an owner or responsible party, and second indicia identifying a particular unmanned aerial vehicle. At least a portion of the first and second indicia together form a unique identifier associating the owner or responsible party with the unmanned aerial vehicle. The unique identifier is readable by a detector spaced away from the unmanned aerial vehicle. In addition, information provided by the sensory system of the unmanned aerial vehicle may be encoded with the unique identifier formed from portions of the first and second indicia. The unique identifier of the beacon may be readable while the unmanned aerial vehicle is in motion relative to the detector, and the attachment mechanism of the beacon may only be removable by an authorized individual.

The beacon described here may also include an unmanned aerial vehicle communications module configured to provide commands and transmit and receive information to and from the unmanned aerial vehicle through the unmanned aerial vehicle communications system, a remote communications module configured to participate on at least one wireless communications system as well as transmit and receive information across the at least one wireless communications system to and from a remote operator, and a beacon control system configured to receive information and commands from the remote communications module and to transform the information and commands for compatibility with the unmanned aerial vehicle. The beacon control system may also transmit the transformed information and commands to the unmanned aerial vehicle through the unmanned aerial vehicle communications module, receive information from the unmanned aerial vehicle through the unmanned aerial vehicle communications module and to transform the information for transmission over the at least one wireless communications system, and transmit the transformed information to the remote operator. The remote communications module of the beacon may switch between wireless communications systems during a flight plan based on a set of predetermined criteria. The beacon control system may transform commands received by the remote communications module by mapping at least one of the received commands to at least one command compatible with the unmanned aerial vehicle. The beacon control system may also determine an appropriate mapping and utilize the determined appropriate mapping so that compatible commands are transmitted to the unmanned aerial vehicle control system.

DETAILED DESCRIPTION

Figure 1:
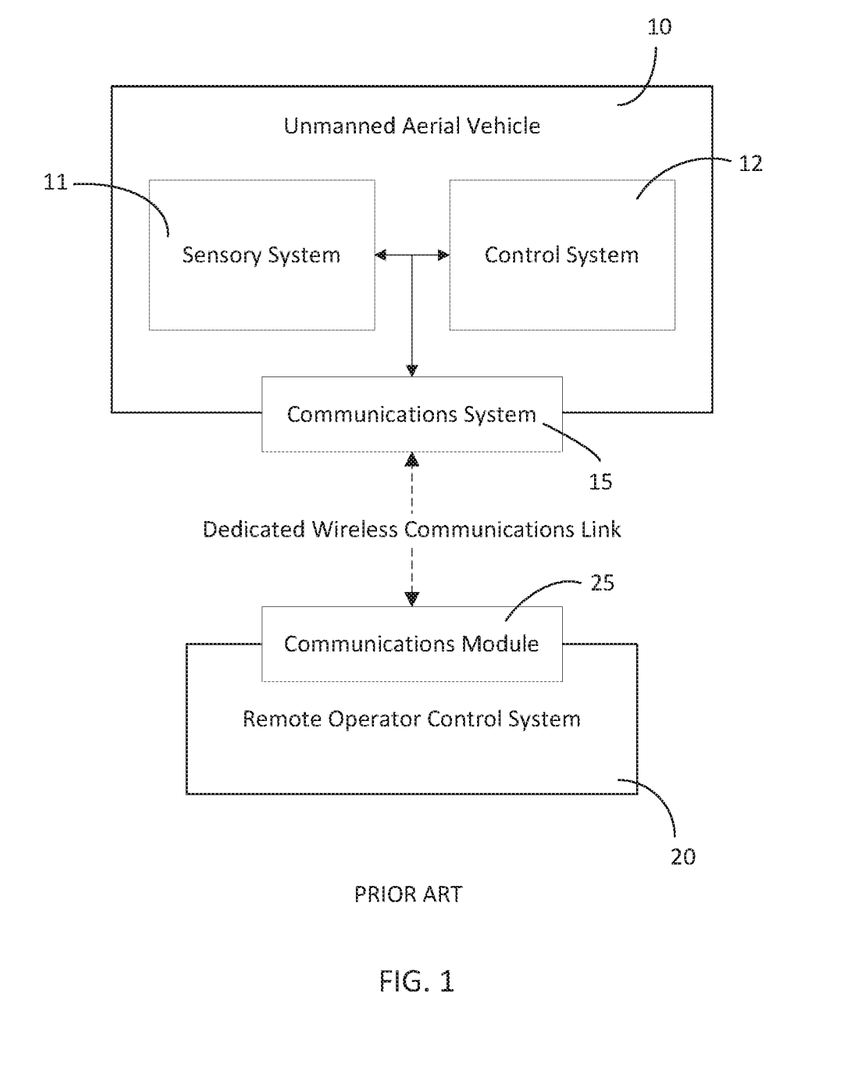
FIG. 1 depicts certain aspects of known UAVs and the remote operator control system.

FIG. 1 depicts a block diagram showing certain aspects of known UAVs 10 and of known remote operator control systems 20. Known UAVs 10 comprise a sensory system 11 and a control system 12. The sensory system 11 and the control system 12 may communicate with each other across a data bus and/or directly with a communications system 15 also included in the UAV 10. The communications system 15 of the UAV 10 transmits information from the sensory system 11, control system 12, and other components of the UAV to the remote operator control system 20. The information from the UAV 10 is transmitted over a dedicated wireless communications link to the communications module 25 of the remote operator control system 20. In some known UAVs 10, the information is instead transmitted over a shared wireless communications link to the communications module 25 of the remote operator control system 20. At least one human operator uses the remote operator control system 20 to process the information being provided by the UAV 10 through the wireless communication link. When the human operator manipulates the remote operator control system 20, a control signal is generated, and the signal is transmitted by the communications module 25 to the UAV 10. The communications system 15 of the UAV 10 receives the control signal from the remote operator control system 20 and the UAV 10 responds to the human operator's commands. Accordingly, the wireless communications link between the UAV 10 and the remote operator control system 20 is used to relay information and control signals to and from the UAV 10 and the remote operator control system 20.

As described above, however, known UAVs do not include identification information in a manner that facilitates a quick determination as to who may be the registered owner of a particular UAV. This is particularly a concern in controlled airspace surrounding airports, secure areas like the White House and Camp David, military bases, and areas with temporary flight restrictions such as Disney World or stadiums and arenas where major sports events are being held. In these areas, agencies responsible for security must be able to first detect the presence of UAVs in the controlled airspace and then determine the registered owner of the detected UAV to determine if the presence of the UAV is authorized. Such a capability would allow the agencies to separate UAVs that are helping, for example, monitor the crowds at a sporting event from UAVs that are being operated by unauthorized individuals.

Figure 2:
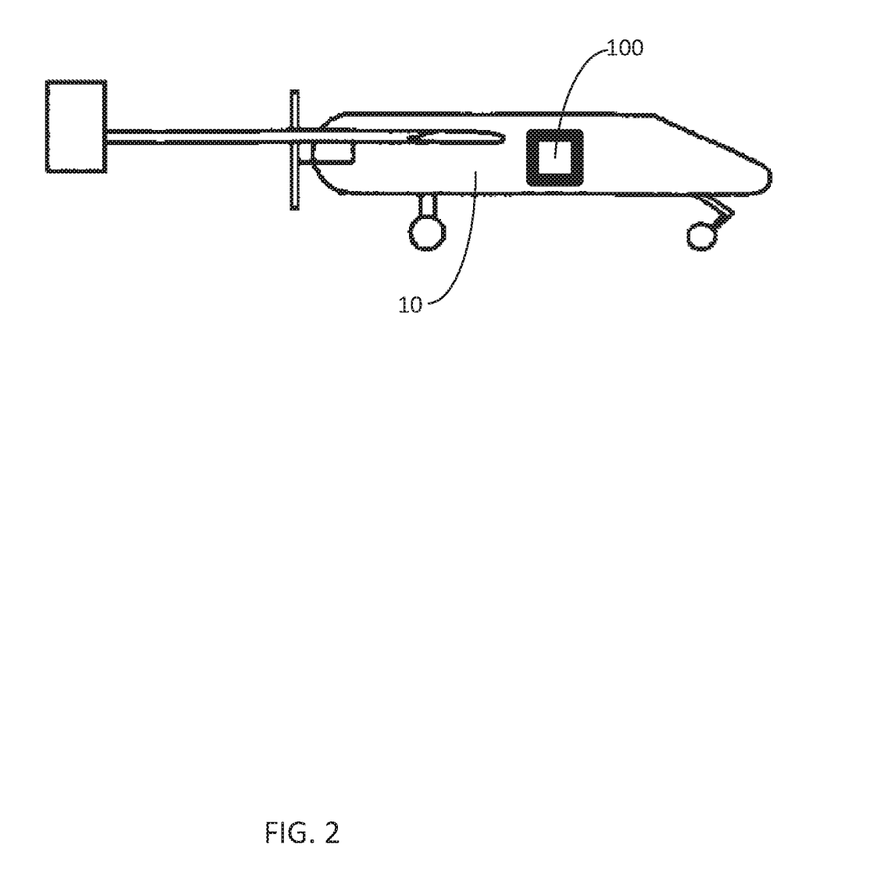
FIG. 2 depicts a known UAV with one embodiment of the beacon attached to the external housing or body of the UAV.

Accordingly, one embodiment of the beacon 100 is affixed to the external housing or body of a UAV 10 as shown in FIG. 2. The beacon 100 is secured to the external housing or body of the UAV 10 so that the owner of the UAV 10 may be quickly identified upon retrieval of the UAV 10, and so that remote interrogation of the beacon 100 may be possible. The beacon 100 is sized and secured so that normal operation of the UAV 10 is not hampered in any manner. In one embodiment of the beacon 100, an external housing 110 encloses components necessary for the functioning of the beacon 100. The beacon 100 also includes an attachment mechanism 130 that provides at least a physical interface for attaching the beacon 100 to the external housing or body of the UAV 10. Further, each of the described embodiments of the beacon are sufficiently small and lightweight so that UAV 10 performance is not adversely affected. Although certain components are depicted in the drawings, it is to be understood that an embodiment of the beacon need not include all of the illustrated components, and that the beacon may include additional components that are not depicted.

First Embodiment of the Vigilent Positioning System

Figure 3:
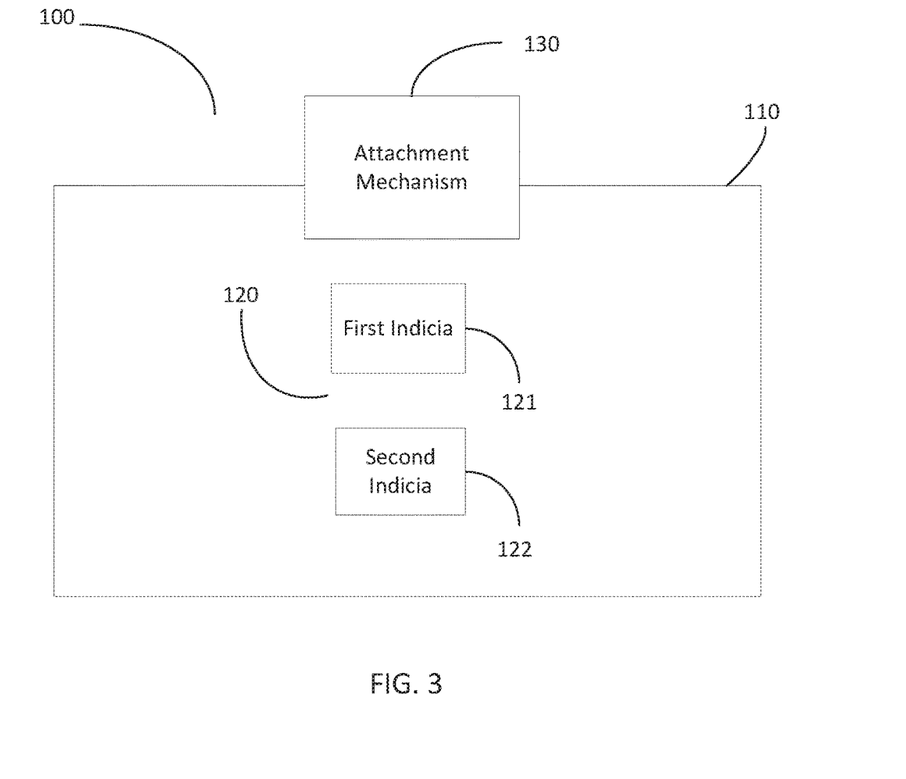
FIG. 3 depicts one embodiment of the components of the beacon.

In one embodiment of the beacon 100, indicia 120 with information is included with the beacon 100. The indicia 120 may include markings embody the information required by regulatory requirements or may include markings that encode the information required by regulatory requirements. Examples of the information needed for compliance with regulatory requirements include the owner's unique identification number issued in compliance with a Certificate of Aircraft Registration/Proof of Ownership issued by the FAA through registration of the vehicle into the Small Unmanned Aircraft System registry. When the indicia 120 embodies the information, the information is human or machine readable without requiring any decoding. For example, an embodiment with indicia embodying the information may have an identification number engraved into the exterior of the beacon 100. When the indicia 120 instead includes encoded information, the information is preferably encoded into the indicia 120 in a commonly machine-readable manner. Embodiments encoding information in this manner may rely on a quick response (QR) code, a bar code, a radio-frequency identification (RFID) tag, a magnetic or optical marker, or another easily accessible and readable format. In certain embodiments, the indicia 120 may exhibit certain characteristics such as radio-opacity to facilitate reading of the encoded information. In some embodiments, the information of the indicia 120 may be both embodied and encoded in a manner allowing both a human and a machine to read the same indicia 120 and obtain the same information. For example, one indicia 120 may incorporate a human-readable version of the information with a machine-readable version of the information.

Embodiments utilizing machine-readable indicia may tailor the indicia 120 to be readable at a distance. For example, one embodiment of the beacon 100 may include indicia 120 that react to an interrogation signal in a manner which may be detected by an active reader spaced away from the external housing 110 of the beacon 100. When the indicia 120 are configured to respond to external stimuli, the response from the indicia 120 is proportionate to the triggering interrogation signal. For example, the response to the interrogation signal received from an active reader spaced within 10 feet of the beacon 100 will be different than the response to the interrogation signal received from a more powerful transmitter located further away at an airport. This ability to react to an active reader some distance from the beacon 100 is particularly useful in situations where precisely locating the beacon 100 for reading by a reader is not desirable, or where remote interrogation of the beacon 100 is desirable. For example, an embodiment of the beacon 100 may be placed within a particular UAV 10 for aesthetic reasons. An active reader can then transmit the interrogation signal and the beacon 100 will transmit a response without necessitating that the beacon 100 be precisely located on the UAV 10. Additionally, an active reader may be placed in a fixed location where multiple UAVs 10 with beacons 100 pass so that information associated with each UAV 10 may be recorded without interrupting the flight of each UAV 10. Such a fixed reader may also be placed in a fixed location so that any UAVs 10 entering the area with a beacon 100 may be quickly detected and identified.

In certain embodiments of the beacon 100, multiple forms of readable indicia may be included to facilitate rapid usage of the information. For example, the beacon 100 may include first indicia 121 that encodes in an optical form the information required by regulation, and second indicia 122 that encodes in a computer-readable form the information required by regulatory requirements. In other embodiments, the beacon 100 may include first and second indicia 121, 122 that have different information. For example, the first indicia 121 may only include the information required by regulation, and the second indicia 122 may only include additional information such as the intended flight plan for the UAV or the intended purposes of the UAV. In some embodiments, the first and second indicia 121, 122 may need to be considered together to obtain the contained information. It should be noted that although embodiments of the beacon 100 including two indicia 121, 122 are described, any number of components may be included as part of the indicia 120 for the beacon 100 are contemplated.

In at least one embodiment of the beacon 100 including the indicia 120, the beacon 100 is produced on a large scale to facilitate wide adoption and to help reduce costs. In such an embodiment, the indicia 120 may be printed or otherwise placed on an external housing 110 of the beacon 100 by the owner after registration is completed. The indicia 120 may be of any form, including optical or magnetic, where the beacons 100 may be produced on a large scale in a cost efficient manner.

In certain embodiments, once information is encoded in the indicia 120, including first or second indicia 121, 122, the information cannot be easily changed without detectible modifications to the beacon 100. This type of indicia 120 is particularly useful when it is desirable to associate certain information with the particular owner or the UAV 10 that was used to collect the information, and when it is desirable to ensure that the information is not tampered with. For example, if the UAV 10 is deployed by law enforcement, it may be desirable to prepare chronological documentation regarding the seizure, custody, control, transfer, analysis, and disposition of evidence gathered by the sensing devices available to the UAV 10. Such chronological documentation establishes a chain of custody to provide assurances regarding the authenticity of data collected by sensing devices.

In certain embodiments, the indicia 120 of the beacon 100 may be initially set upon manufacture or installation, but may also be subsequently modified to incorporate additional and/or changed information. The ability to modify the indicia 120 may be used to maintain an ongoing record of the various owners of the UAV 10, the various modifications made to the UAV 10, or other types of information. In other embodiments where tampering is undesirable, such as when the indicia 120 are used to associate information with the particular owner or the UAV 10 used to collect the information, an indication that the indicia 120 was modified will be included in the beacon 100.

Figure 4:
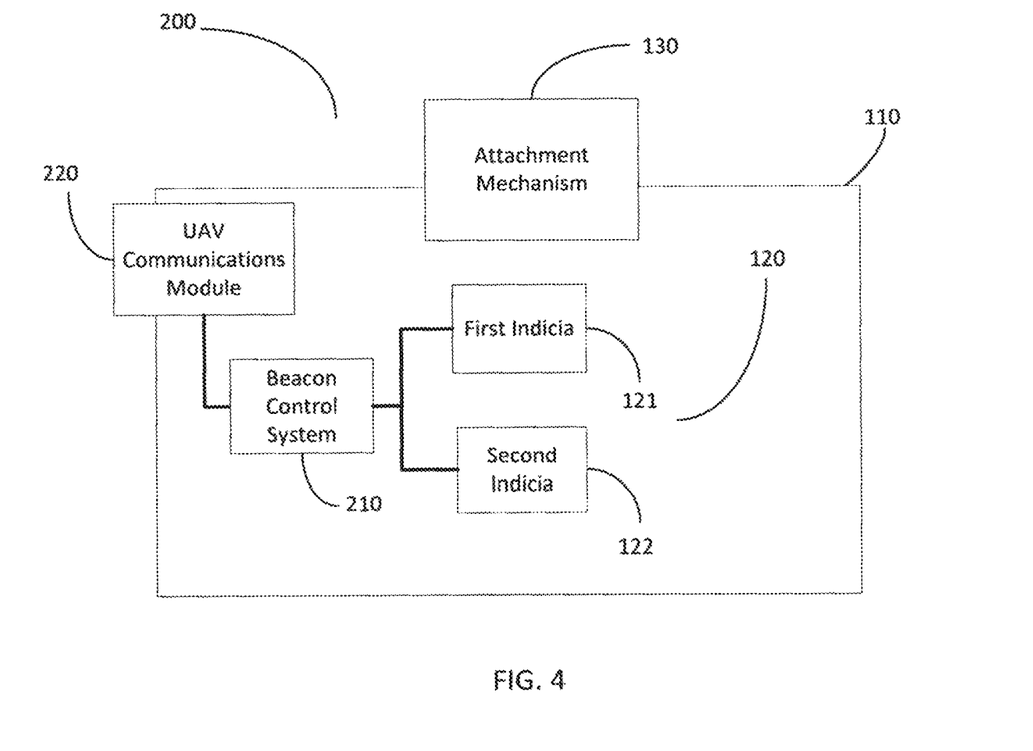
FIG. 4 depicts another embodiment of the components of the beacon.

FIG. 4 depicts an embodiment of the beacon 200 that helps provide such assurances regarding the authenticity of data collected by a UAV 10. This embodiment of the beacon 200 includes a beacon control system 210 and a UAV communications module 220. The beacon control system 210 includes circuitry such as a processor configured to include the logical steps needed to execute certain functions of the beacon 200, and memory configured to store any programs or data needed by the processor to perform the functions of the beacon 200. In addition, the processor is configured to communicate with components of the beacon 200 as necessary. In certain embodiments of the beacon 200, the beacon control system 210 utilizes the information contained in the indicia 120. When the indicia 120 includes first and second indicia 121, 122, for example, the beacon control system 210 reads the information encoded by the first and second indicia 121, 122 so that the needed information is available to the processor of the beacon control system 210. In other embodiments when various forms of indicia 120 are available, the processor of the beacon control system 210 will retrieve the needed information from the appropriate subset of indicia 120 or the entirety of the indicia 120 so that the desired functions may be performed. The beacon control 210 can also communicate with the UAV 10 communications module 220 which interfaces with the sensory and/or control systems of a UAV 10 as necessary.

For example, a UAV 10 may be deployed with a particular sensory package for surveillance for law enforcement purposes. As the sensory package is employed, the UAV 10 may provide information such as its current location or the current time so that the sensory package may integrate this data into the information being stored or transmitted for later retrieval and analysis. In such a situation, the UAV 10 may also retrieve information encoded in the indicia 120 through the UAV communication module 220 and the beacon control system 210 that may help uniquely identify the owner and/or the UAV 10 employed to collect the information to be analyzed. This information retrieved from the indicia 120 may be encoded into the information being stored or transmitted for later retrieval and analysis using known techniques such as watermarking so that the information retrieved from the indicia 120 helps provide assurances regarding the authenticity of the data collected by the UAV 10. Thus, in addition to the contemporaneous location and time information that is integrated into the data collected by the sensory package, the information retrieved from the indicia 120 provides another form of assurance that the information recorded by the sensory package of the UAV 10 is authentic. This data collected by the sensory package may be stored on the UAV 10 itself for later retrieval, may be transmitted to the remote operator, or may be both stored on the UAV 10 and transmitted to the remote operator. When information from the indicia 120 is employed in this manner, it is preferable that the information encoded in the indicia 120 be resistant to modification so that, at a later time, the particular UAV 10 that was utilized to collect the information may be identified with certainty.

The UAV communications module 220 allows for at least one-way communication from the beacon 200 to UAV 10. In such embodiments, the beacon control system 210 retrieves the information encoded in the indicia 120 and based on a request received by the UAV communications module 220, the beacon control system 210 transmits the encoded information to the UAV 10. In some embodiments, two-way communication between the beacon 200 and the UAV 10 is desirable. In these embodiments, the UAV communications module 220 transmits and receives information to and from the beacon control system 210. The beacon control system 210 performs the tasks necessary to satisfy any requests for information from the UAV 10, and also performs the tasks necessary to process any information received from the UAV 10. In some embodiments, the attachment mechanism 130, in addition to providing a physical interface for attaching the beacon 200 to the UAV 10, also provides an interface for the beacon 200 to communicate with the UAV 10 directly. For example, the attachment interface 130 may include a USB interface so that the beacon 200 may directly communicate with aspects of the UAV 10 and/or the sensory package being carried by the UAV 10. The attachment interface 130 may also provide electrical power for the beacon Other types of electrical interfaces may be utilized to facilitate communication between the beacon 200 and the UAV 10 and are not specifically enumerated here.

In certain embodiments, the attachment mechanism 130 includes the ability to lock and prevent unauthorized individuals from detaching the beacon 100. Combination locking mechanisms or keyed locking mechanisms may be employed for this purpose so that only individuals with the correct combination and/or key may detach the beacon 100 from the external housing or body of the UAV 10. Other techniques for securing the beacon 100 to the UAV 10 in a manner that prevents unauthorized removal are not specifically described here.

As is clear from the above description, this embodiment of the beacon 100 provides a technical solution to the technical problem of providing a uniform technique to identify the owner of a particular UAV. More particularly, by including the indicia 120 in a manner that is easily accessible, identification of particular UAVs 10 operating in particular airspace is facilitated. The above described embodiment also provides a technical solution to the problem of authenticating information that is collected by a UAV 10 during operation by allowing for information such as the information contained in the indicia 120 to be embedded into the collected information. This described embodiment of the beacon 100 also provides a uniform interface for communicating with the UAV 10 including the retrieval of information collected by the UAV 10 during operation and the transmission of commands from the operator using an interface that is not specific to the particular model or type of UAV 10 being employed.

Second Embodiment of the Vigilent Positioning System

Figure 5:
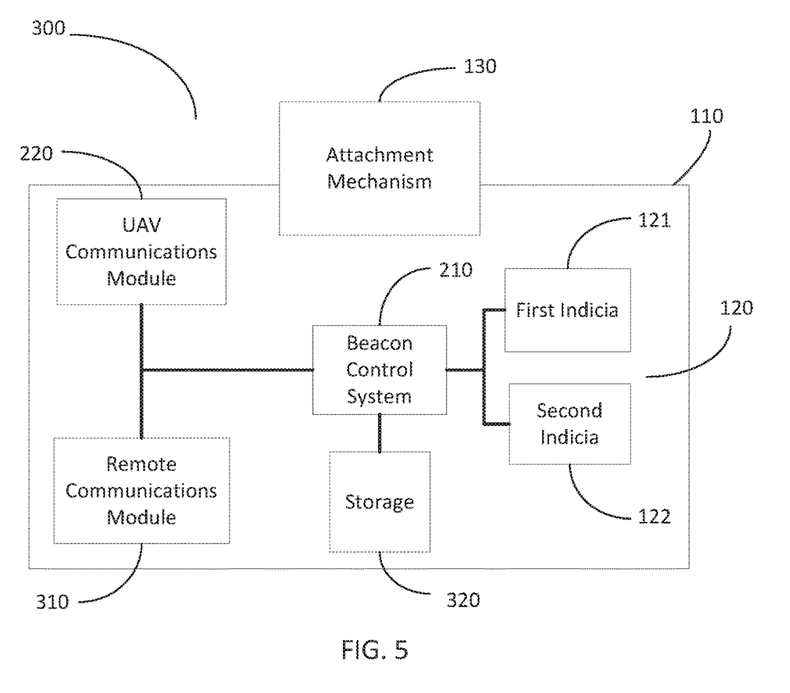
FIG. 5 depicts yet another embodiment of the components of the beacon.

The beacon may also operate as a universal component that allows a UAV 10 to communicate with a remote operator using any available wireless communications networks. These wireless communications networks may operate on any compatible frequency including frequencies from 500-980 MHz. FIG. 5 depicts an embodiment of the beacon 300 that includes aspects described above for the first embodiment of the beacon such as the beacon control system 210, indicia 120 including the first and second indicia 121, 122, a UAV communications module 220, and the attachment mechanism 130. The depicted beacon 300 also includes storage 320 and a remote communications system 310. The storage 320 is available for the beacon control system 210 to utilize as needed to store programs, data, or other information necessary for the beacon control system 210 to perform its tasks. The storage 320 may be such as a hard disk, an optical disc, solid state memory, or any other computer-readable media.

The beacon 300 also includes a remote communications module 310. The remote communications module 310 facilitates communication between the beacon 300 and an underlying wireless communications system such as a Wi-Fi network, a cellular phone network, a satellite network, FirstNet, or another suitable wireless communications system. In some embodiments, the remote communications module 310 may switch seamlessly between different wireless communications systems as needed to ensure a reliable connection with the remote operator. The remote communications module 310 may employ a software-defined radio so that fewer separate hardware components for each wireless communication system must be included in each beacon 300. In other embodiments, a combination of hardware and software may comprise the components needed to interact with a particular wireless communications system.

Through the use of the remote communications module 310, the beacon 300 and the UAV 10 participate on the wireless communications network without requiring additional configuration within the wireless communication network. Instead, the beacon 300 performs all the necessary negotiation of protocols, frequencies, or other parameters so that the beacon 300 can transmit and receive information over the wireless communications network. When, for example, the beacon 300 participates on a cellular network, all the functions a typical cellular phone on the cellular network would ordinarily perform are executed by the beacon 300. In some embodiments, the beacon 300 may include hardware so that a subscriber identity module (SIM) may be inserted. Similar to the function provided by a SIM in a mobile phone, including a SIM with the beacon 300 assigns a particular international mobile subscriber identity (IMSI) and its related key. In some embodiments of the beacon 300, hardware components similar to those used by mobile phones are used to receive the SIM and to participate on the corresponding wireless communications network. In other embodiments, the beacon 300 may include specialized hardware components for participation on the corresponding wireless communication network.

One way the UAV 10 equipped with the beacon 300 participates on the wireless communications network is by transmitting and receiving commands to and from a remote operator control system 20 so that the UAV 10 may be remotely piloted. Another way the UAV 10 equipped with the beacon 300 may participate on the wireless communications network is by uploading sensory data to the wireless communications network so that other systems may receive and process the sensory data. As is clear from this description, the remote operator control system 20 need not be the same as the monitoring system that receives and processes sensory data.

By including a SIM, an IMSI and key are associated with a beacon 300. These identifiers, along with other information such as the indicia 120, may be relied upon to uniquely identify a UAV 10 equipped with a beacon 300. For example, while a beacon 300 with a SIM is in operation, wireless communications network providers can retrieve information based on the IMSI and key such as the billing contact information. There is a possibility, however, that the beacon 300 is being utilized on a UAV 10 owned by an individual with no relationship to the billing contact information. Accordingly, the beacon 300 includes the ability to retrieve information from the indicia 120 and transmit this information across the wireless communication network so that the purported owner of the UAV 10 may be identified. In at least some embodiments, a unique identifier physically associated with the UAV 10 may be used instead of or in addition to the indicia 120 so that a higher degree of confidence as to the owners of the UAV 10 may be provided.

The beacon 300 also includes the beacon control system 210. The beacon control system 210 may translate information and commands received by the remote communications module 310 for compatibility with the UAV 10. For example, the commands and information being transmitted over the wireless communications system may be compressed or otherwise optimized for transmission. In such a circumstance, the beacon control system 210 will transform the commands and information so that the UAV 10 only receives the compatible transformed commands and information. The beacon control system 210 may also transform any information from the UAV 10 for transmission to the remote operator over the wireless communications system by compressing or otherwise optimizing the information prior to transmission by the remote communications module 310. In some embodiments, certain portions of the transformation may be performed by the remote communications module 310 and/or the UAV communications module 220 and/or the beacon control system 210. The transformation of the commands may be performed by mapping at least one command received by the remote communications module 310 from the remote operator to at least one command compatible with the UAV 10. In some embodiments, the transformation involves multiple commands being mapped onto a single compatible command, or a single command being mapped onto multiple compatible commands.

The UAV communication module 220 is capable of utilizing a variety of interfaces so that the beacon 300 can transmit the commands received by the remote communications module 310 to the UAV 10. In one embodiment, the UAV communication module 220 utilizes the proximity of the beacon 300 to overpower the typical communications between the UAV 10 and the operator. More specifically, this embodiment of the beacon 300 will utilize the same frequencies and protocols the UAV 10 typically receives from the operator, but the commands will be transmitted by the beacon 300, not the operator. Such a configuration is desirable when, for example, an unknown UAV 10 is operating in a restricted airspace. When the UAV 10 is identified as being a unmanned vehicle that should be landed, the remote communications module 310 receive commands for overriding the operator's commands and for landing the UAV 10 in a controlled manner. The beacon 300 then utilizes the UAV communications module 220 to transmit appropriate landing commands to the UAV 10 using the frequencies and protocols understood by the UAV 10. Due to the proximity of the beacon 300, however, the commands being transmitted by the beacon 300 override any commands that may be transmitted by the operator who is typically much further away and therefore transmitting a much weaker signal to the UAV 10.

To illustrate these aspects of the beacon 300, the Vigilent Immersive Simulation Studio will be described in conjunction with the above described beacon 300. The Vigilent Immersive Simulation Studio employs curved screen displays that provide an immersive panoramic display of the current surroundings for the UAV 10, and control systems for the remote operator to direct the UAV 10. If, for example, a particular UAV 10 is not equipped to provide an immersive panoramic display of the current surroundings of the UAV 10, the beacon 300 may translate the available sensory information so that the Vigilent Immersive Simulation Studio can provide the needed immersive experience to the operator without requiring reconfiguration of the Vigilent Immersive Simulation Studio itself. Alternatively, the beacon 300 may also translate the commands provided by the Vigilent Immersive Simulation Studio so that the UAV 10 receives commands compatible with the remote operator control system 12. It is of course possible that only certain commands from the remote operator control system 20 may be translated by the beacon 300 prior to retransmission to the UAV 10, and that only certain sensory information from the UAV 10 may be translated by the beacon 300 prior to retransmission to the remote operator control system 20.

The beacon 300 may also employ a set of criteria for determining which wireless communications system to employ during a portion of a given flight plan. For example, the beacon 300 may first rely on a Wi-Fi network until the reliability or the bandwidth available over the Wi-Fi network becomes unacceptable. The beacon 300 may then rely on a cellular network until the reliability or the bandwidth available over the cellular network becomes unacceptable, at which point the beacon 300 may rely on a satellite network or FirstNet. The beacon 300 may also consider other factors such as cost, latency, or resistance to interception when determining which wireless communications system to utilize. In some embodiments, the remote operator may specify the particular wireless communications system to be utilized during portions of a given flight plan.

To provide a concrete example of this aspect of the beacon 300, consider a UAV 10 with a flight plan where the remote operator may communicate with the UAV 10 through the beacon 300 using Wi-Fi due to the relatively proximity of the remote operator and the UAV 10. For a second portion of the flight plan, the UAV 10 will have traveled sufficiently far from the remote operator that another wireless communications system is needed. At this stage, the beacon 300 may utilize a cellular phone network to communicate with the remote operator. At a third portion of the flight plan, the UAV 10 is approaching an area with limited cellular coverage so the beacon 300 may utilize a satellite network to communicate with the remote operator. As the UAV 10 returns to the remote operator, the beacon 300 may switch back to different types of wireless communications systems based on predetermined criteria.

By including such a beacon 300, each UAV 10 need not include all the components and logic for determining the appropriate wireless communications system to utilize during the flight plan. Rather, the beacon 300 may be utilized so that changes in the availability of certain wireless communications systems need not affect the components or the logic contained in a particular UAV 10.

The beacon 300 may also operate as a translator between multiple different types of control systems for operating a single UAV 10. Remote operators may already have a particular control system 20 available that is suitable for use with a UAV 10, where the particular control system is not designed to operate with the UAV 10. In other circumstances, a particular control system 20 is more desirable than another controls system due to the available controls, displays, level of operator comfort, and other factors. Similar to the mapping described above, the beacon 300 may be configured so that the beacon control system 210 includes multiple mappings for particular remote operator control systems 20 available to a particular remote operator and the commands available for a particular UAV 10. The remote operator then chooses the control system 20 to be used and associates the control system 20 with the beacon 300. The beacon control system 210 then handles the translation of commands and information to and from the UAV 10 and the remote operator control system 20. In at least some embodiments, the beacon 300 performs the translation in a manner where neither the UAV 10 nor the control system 20 utilized by the remote operator requires modification to perform their desired tasks. In certain embodiments, the beacon 300 may automatically determine the appropriate mapping for a particular control system 20 utilized by the remote operator based on the transmissions and/or commands received by the remote communications module 310. In these embodiments, the remote operator could, for example, utilize a first control system 20 during a first portion of a flight plan, and then utilize a second control system 20 during a second portion of a flight plan. In such a scenario, the beacon 300 would recognize transmissions from the second control system 20 and automatically utilize the mapping appropriate for the second control system 20 so that the UAV 10 remains under control of the remote operator. Such a beacon 300 would also be suitable for when a first control system 20 becomes inoperable and the remote operator must then use a second control system 20 to control the UAV 10.

From the above description, it is evident the above described embodiment addresses the technical problem of known UAVs 10 where the UAV 10 requires specific communications equipment so that the operator may control the UAV 10. The above described embodiment addresses this technical problem by providing a technical solution that allows for the operator and the UAV 10 to use a uniform communications interface that can operate on any available wireless interface so that contact with the UAV 10 is maintained throughout its operation. The above described embodiment also provides a mechanism by which the controls for a UAV 10 may be overridden when necessary. Additionally, this embodiment of the beacon 100 may also include aspects of the first embodiment described above, and may also provide technical solutions for the technical problems described above.

Third Embodiment of the Vigilent Positioning System

Figure 6:
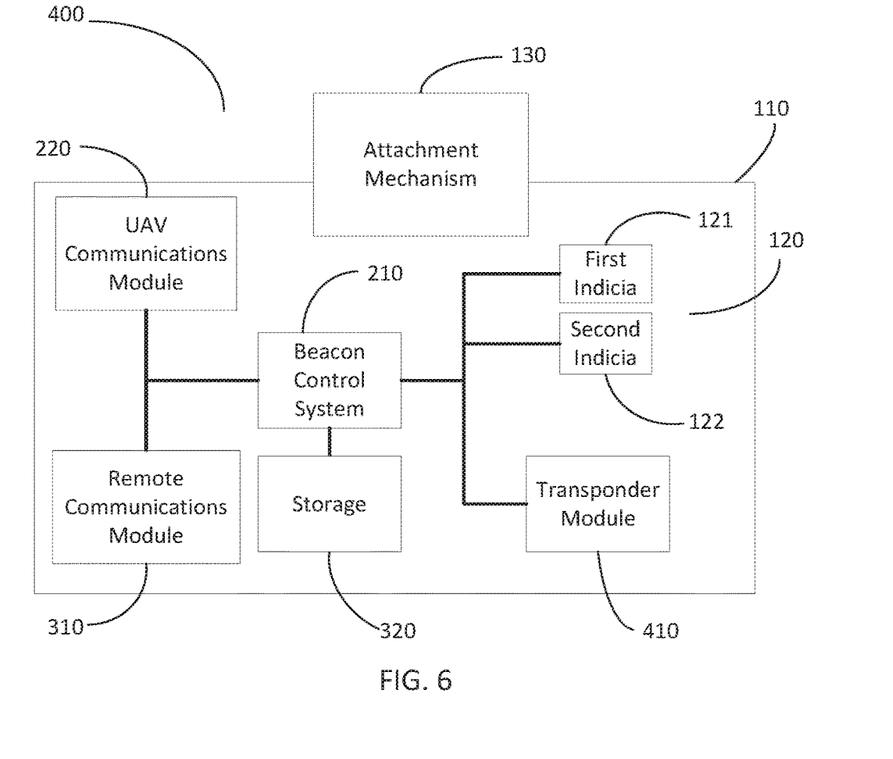
FIG. 6 depicts a still further embodiment of the components of the beacon.

In another embodiment, the beacon 400 acts in a manner similar to an aircraft transponder by broadcasting a response to a radio-frequency interrogation signal. Like aircraft transponders, this embodiment of the beacon 400 is useful for identifying a UAV 10 on air traffic control radars and for avoiding collisions with other aircraft. In at least one embodiment, transponder codes like those used by conventional aircraft transponders are employed by the beacon 400 so that the UAV 10 may be easily identified on air traffic control radars without requiring the modification of existing systems. Such a beacon 400 would, for example, be in compliance with the requirements of established systems such as the Airborne Collision Avoidance System (ACAS II) or other types of ground collision avoidance technology that operates independently of ground-based equipment and air traffic control. Certain embodiments of the beacon 400 may also comply with the Automatic Dependent Surveillance—Broadcast (ADS-B) standard being employed in the Next Generation Air Transportation System being deployed in the United States, for example.

Certain embodiments of the beacon 400 may also periodically emit small signal bursts comprising pulse sequences or other patterns to indicate that the vehicle onto which the beacon 400 is attached is a UAV 10. These signal bursts are emitted by the transponder module 410, shown with other aspects of the beacon 400 in FIG. 6. By including the transponder module 410, the detectability of UAVs 10 equipped with the beacon 400 is ensured even if the UAV 10 has a small radar signature or return. Instead of relying on the ability of their radar or other systems to directly detect the UAV 10, air traffic controllers or other interested parties may rely on the small signal bursts to determine the presence and the location of the UAV 10. The pulse sequences or other patterns may be transmitted along the same frequencies as current aircraft transponders, or may be transmitted along other frequencies that are also easily detected by existing radars and other air traffic control equipment. The pulse sequences or other patterns may be optimized to minimize power consumption, maximize range, minimize interference, or other desirable attributes. These pulse sequences or other patterns are also in compliance with the air traffic control standard which the embodiments of the beacon 400 are in compliance with, if any. In some embodiments, the small signal bursts transmitted by the beacon 400 are also detectable by other vehicles in nearby airspace.

In at least some embodiments, the pulse sequences or other patterns being employed are unique to UAVs 10. In these embodiments, the pulse sequences or patterns emitted by the transponder module 410 may be recognized by a human operator, by appropriately configured equipment, or both. Such a unique pulse sequence or pattern facilitates rapid identification of UAVs 10 which is desirable in situations where other air traffic is traveling through the area. In certain embodiments, the pulse sequences or patterns may incorporate a first portion that indicates the transmission is originating at a UAV 10, and then additional portions that provide other types of information. The pulse sequences or other patterns of the first portion of a signal may also include information in addition to the distinctive pulse sequences or patterns associated with UAVs. In some embodiments, the additional information included with the small signal burst may be encoded or encrypted so that only appropriately configured equipment can decode or decrypt the additional information. The additional information may include, for example, information identifying the owner and/or operator, information associated with any government or other registration of the UAV 10, or other types of information which may be useful for those tasked with managing airspace. In some embodiments, the beacon 400 may transmit real-time information using the pulse sequences or other patterns. For example, the small signal bursts may include altitude, velocity, heading, and other information that describe the current flight plan for the UAV 10. In some embodiments, other information such as the current power status of the UAV 10, the operating status of various components of the UAV 10, and other information may be transmitted by the small signal bursts.

In certain situations, embodiments of the beacon 400 may transmit a signal that is detectable by satellites or communications systems other than air traffic control systems. For example, these embodiments may transmit information to existing aeronautical satellite communications systems using the ACARS communication protocol. Such a capability is desirable when the UAV 10 travels beyond the range of the wireless communications systems being employed. To accommodate such a switch of wireless communications systems, embodiments of the beacon 400 may include the capability to communicate with multiple communications networks using multiple communications protocols. In certain embodiments, the beacon 400 may apportion certain types of information for transmission through a first wireless communications system and transmit the remaining information through a second wireless communications system. Such a configuration would allow, for example, information regarding the velocity, heading, and other information for the UAV 10 to be transmitted in a manner that air traffic control systems can receive and process, while other information such as the operating status of various components is transmitted in a manner that satellite communications systems can receive and process. In addition to offering redundancy, possible benefits of such a configuration including allowing for air traffic control systems to process information most relevant for their purposes while allowing for other types of information to be transmitted through a different wireless communications system, and minimizing the number of modifications necessary for commonly-installed equipment.

For example, in compliance with ADS-B Out which is a service that is part of the ADS-B standard, the beacon 400 may use the transponder module 410 to periodically broadcast identification, the current position, altitude, and velocity of the UAV 10 to which the beacon 400 is attached. A beacon 400 that is in compliance with this standard will also include the needed components such as a datalink radio. When appropriate, embodiments of the beacon 400 may implement the needed components using other existing components of the beacon 400 so that hardware costs and power consumption are minimized. This information provides air traffic controllers real-time position information that at times is more precise than radar-based systems. Such real-time position information may be provided at least by the position information obtained from an approved ADS-B position source. In some embodiments, this information may be supplemented by additional data so that more precise position information may be obtained. In accordance with the ADS-B standard, the beacon 400 may communicate with either surface-based stations or space-based satellites. By operating within the ADS-B standard, other aircraft in the airspace with equipment in compliance with ADS-B In, another part of the ADS-B standard, can receive information transmitted by the beacon 400 in compliance with ADS-B Out so that collision avoidance independent of air traffic control is possible. Certain embodiments of the beacon 400 may implement both ADS-B Out and ADS-B In standards so that information being transmitted by other aircraft in the vicinity may be utilized. Embodiments employing both standards may forward relevant information transmitted by other aircraft so their operators have an improved understanding of the vehicles in the airspace surrounding the UAV 10. The forwarded relevant information may include the real-time position information of the other vehicles operating in the airspace, for example.

From the above description, it is evident the above described embodiment addresses the technical problem of known UAVs 10 where the UAV 10 is difficult to detect due to its small size and radar signature. The above described embodiment addresses this technical problem by broadcasting signals compatible with existing air traffic control radars and other systems used to monitor airspace. Additionally, this embodiment of the beacon 100 may also include aspects of the first and second embodiments, described above, and may also provide technical solutions for the technical problems described above.

Although the invention is illustrated and described herein with reference to specific embodiments, the beacon is not intended to be limited to the details shown. Rather, various modifications may be made in the details within the scope and range equivalents of the claims and without departing from the invention.

What is claimed is:

1. A beacon attached to an unmanned aerial vehicle, the unmanned aerial vehicle including a control system, a sensory system, and a communications system, the beacon comprising:
    an attachment mechanism configured to securely and removably attach the apparatus to the unmanned aerial vehicle;
    an unmanned aerial vehicle communications module configured to provide commands and transmit and receive information to and from the unmanned aerial vehicle through the unmanned aerial vehicle communications system;
    a remote communications module configured to participate on at least one wireless communications system, the remote communications module being configured to transmit and receive information across the at least one wireless communications system to and from a remote operator;
    a beacon control system configured to receive information and commands from the remote communications module and to transform the information and commands for compatibility with the unmanned aerial vehicle, the beacon control system further being configured to transmit the transformed information and commands to the unmanned aerial vehicle through the unmanned aerial vehicle communications module;
    wherein the beacon control system is further configured to receive information from the unmanned aerial vehicle through the unmanned aerial vehicle communications module and to transform the information for transmission over the at least one wireless communications system; and
    wherein the remote communications module transmits the transformed information to the remote operator.

2. The beacon of claim 1, wherein the remote communications module switches between wireless communications systems during a flight plan based on a set of predetermined criteria.

3. The beacon of claim 1, wherein the beacon control system transforms the commands received by the remote communications module by mapping at least one of the received commands to at least one command compatible with the unmanned aerial vehicle.

4. The beacon of claim 3, wherein the beacon control system determine an appropriate mapping and utilize the determined appropriate mapping so that compatible commands are transmitted to the unmanned aerial vehicle control system.

* * * * *